Figure 6:
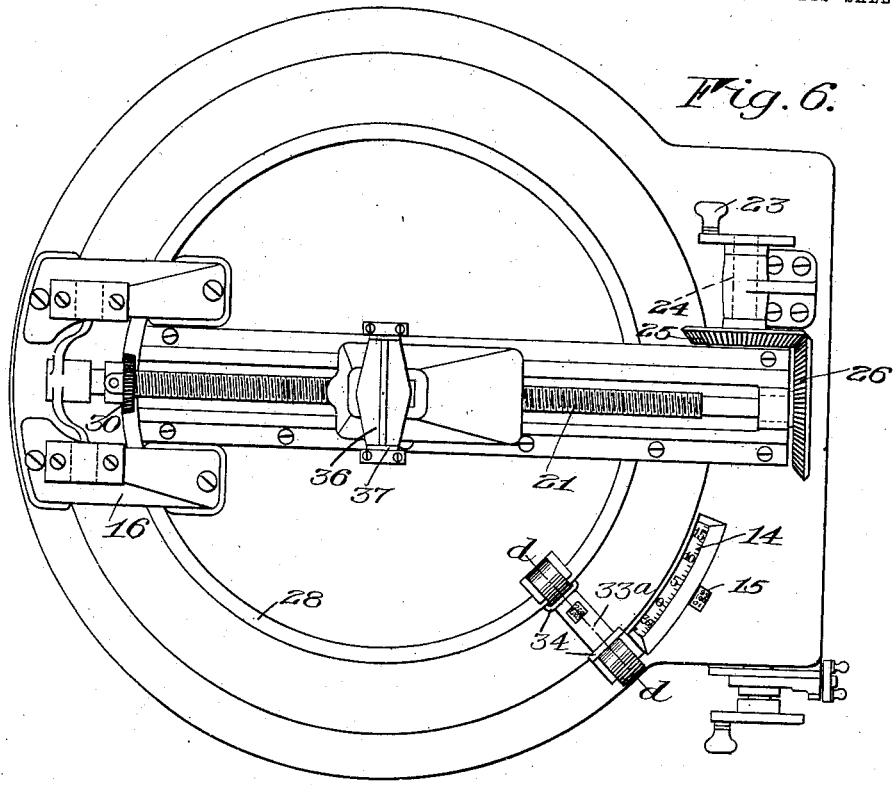

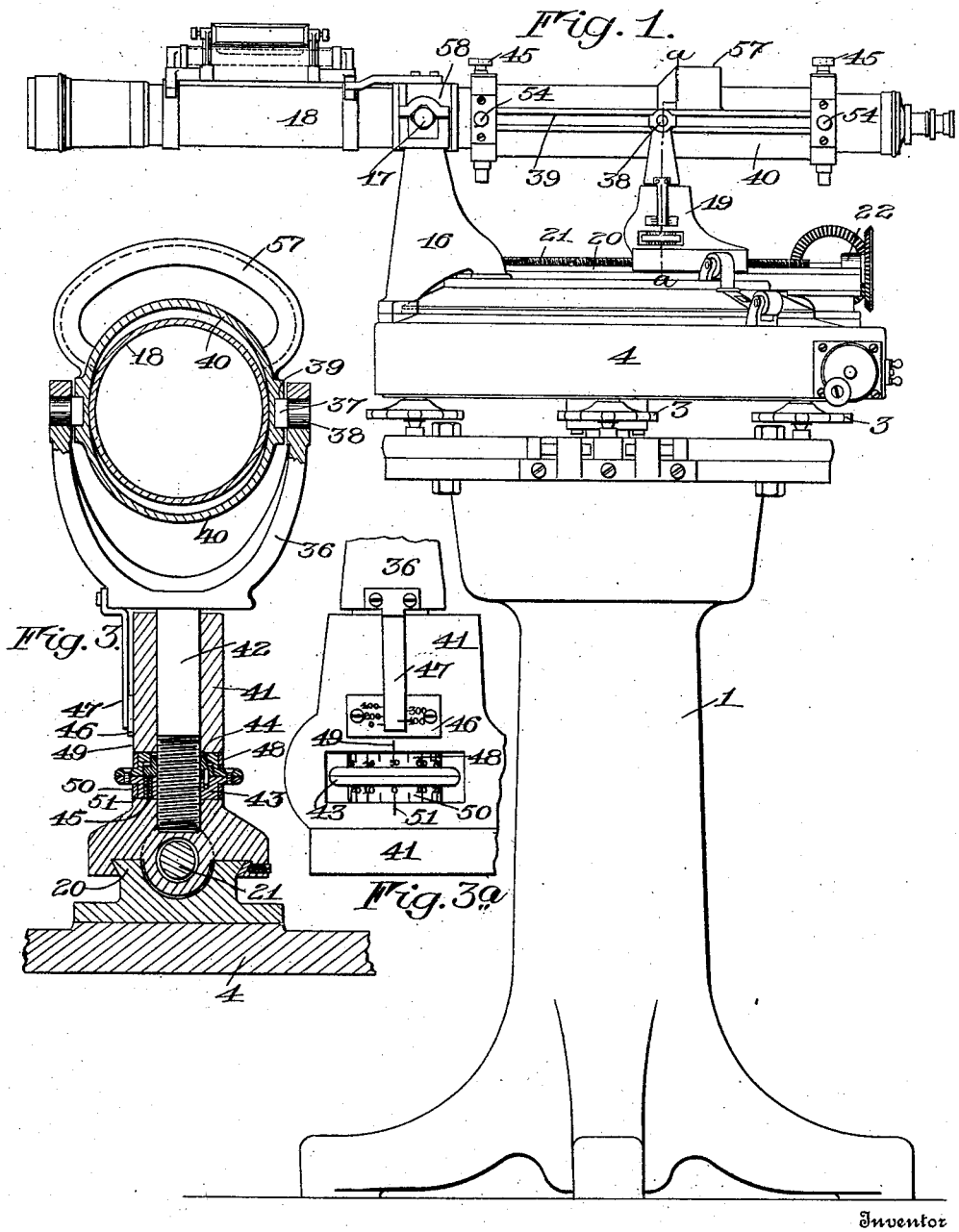

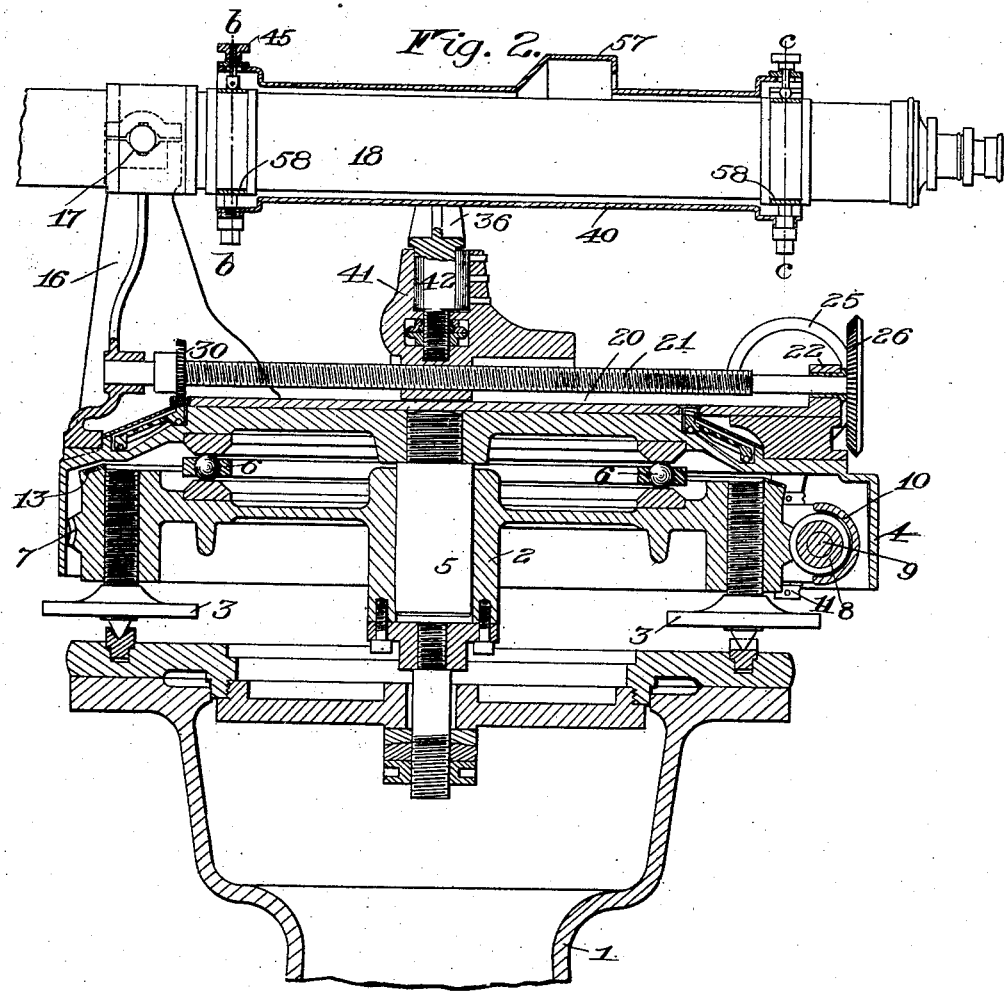
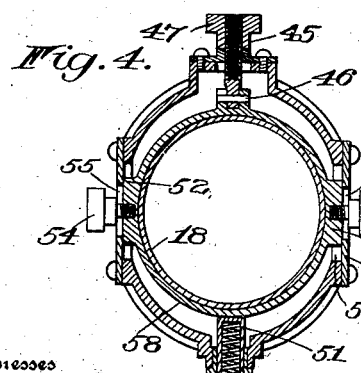
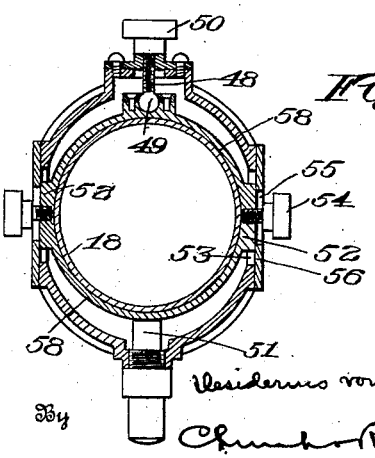

D. VON NAGY.
DEPRESSION RANGE FINDER.
APPLICATION FILED NOV. 23, 1907.

918,190.

Patented Apr. 13, 1909.
4 SHEETS—SHEET 3.

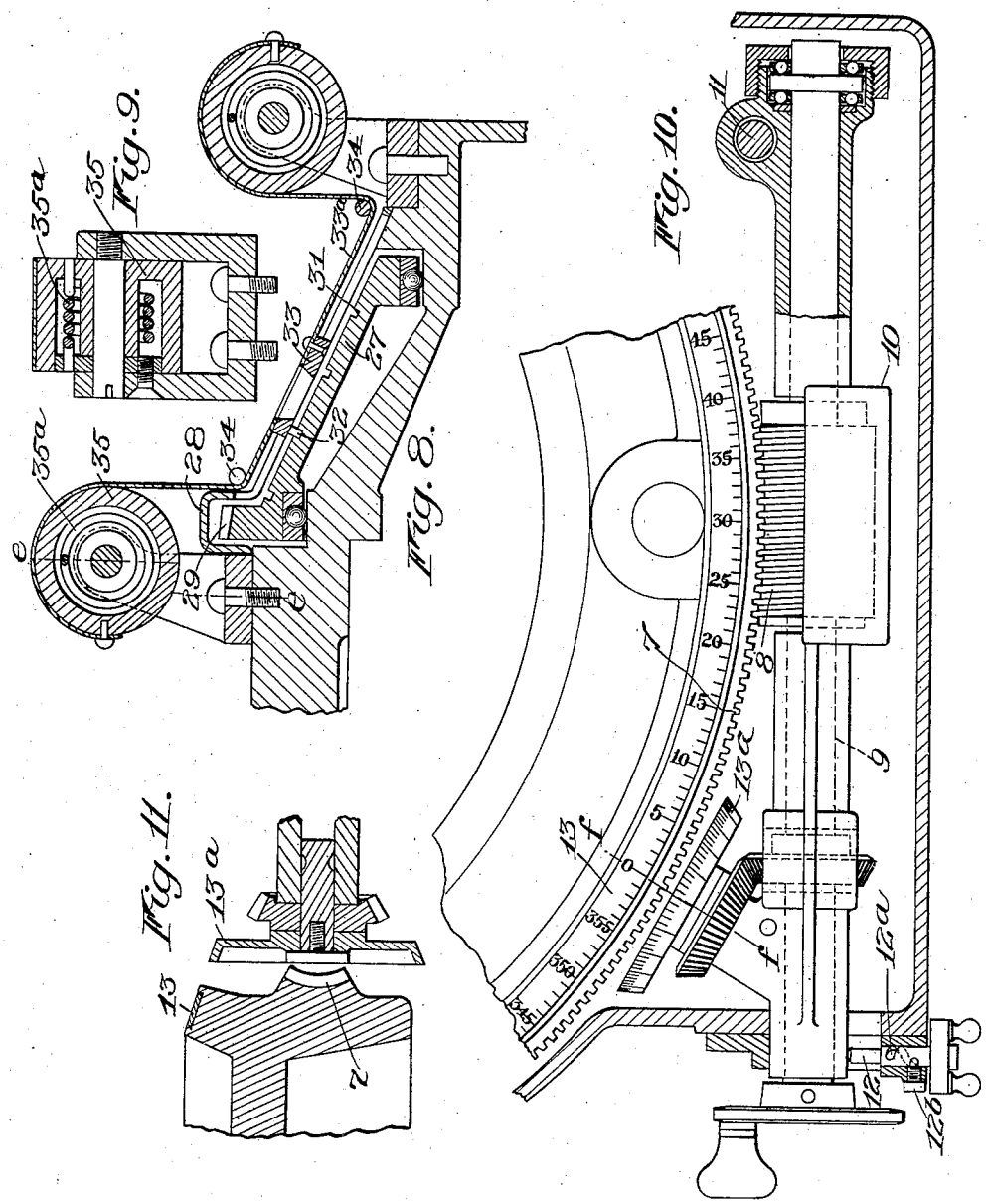

UNITED STATES PATENT OFFICE.

DESIDERIUS VON NAGY, OF ROCHESTER, NEW YORK, ASSIGNOR, BY MESNE ASSIGNMENTS, TO BAUSCH & LOMB OPTICAL COMPANY, OF ROCHESTER, NEW YORK, A CORPORATION OF NEW YORK.

DEPRESSION RANGE-FINDER.

No. 918,190.   Specification of Letters Patent.   Patented April 13, 1909.

Application filed November 23, 1907. Serial No. 403,487.

*To all whom it may concern:*

Be it known that I, DESIDERIUS VON NAGY, of Rochester, in the county of Monroe and State of New York, have invented certain new and useful Improvements in Depression Range-Finders; and I do hereby declare the following to be a full, clear, and exact description of the same, reference being had to the accompanying drawings, forming a part of the specification, and to the reference characters marked thereon.

The present invention relates to range finders of the type in which the distance of an object is obtained by triangulation, through the medium of a telescope arranged at a known height forming the base of a vertical right triangle, the lower angle of which is constant and equal to 90°, and the upper angle of which is variable and is determined by the depression of the telescope or distance of the observed object. In this type of apparatus to obtain a correct reading by the indicating means it is necessary to make correction for the curvature of the earth and for the refraction of the atmosphere to agree with existing conditions. As, however, the refraction of the atmosphere is different at different points on the earth's surface, a correction for one known point is of little value for a point at a distance therefrom. With this invention, correction of the indicating means for the curvature of the earth and the refraction of the atmosphere, which by the way affect the reading of the instrument in opposite directions, is made simultaneously by correcting the instrument for a plurality of known points and in this manner substantially correct readings for intermediate points can be obtained.

To these and other ends the invention consists in certain improvements and combinations of parts all as will be hereinafter more fully described, the novel features being pointed out in the claims at the end of the specification.

An embodiment of the invention is shown in the accompanying drawings, in which—

Figure 7:
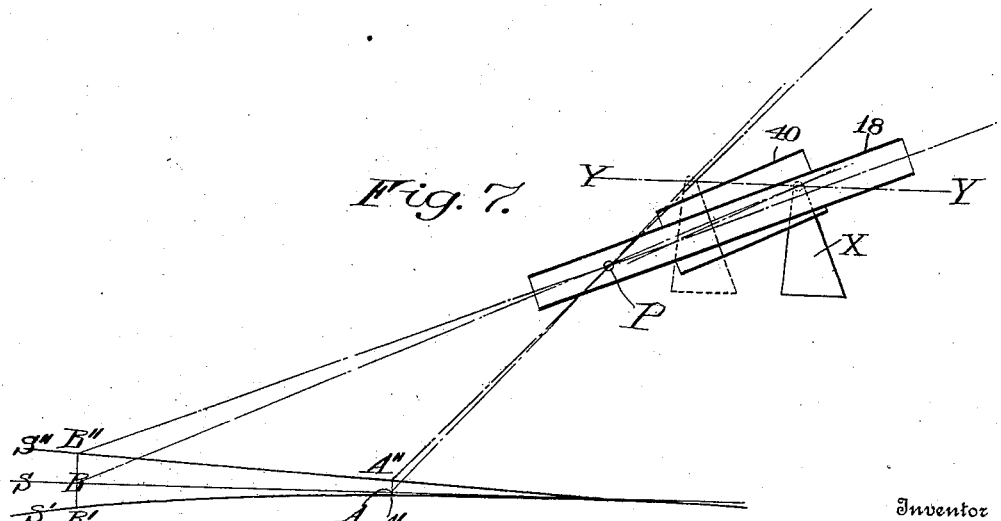

Figure 1 represents a side elevation; Fig. 2 represents a vertical section in the direction of the optical axis of the telescope, parts being shown in elevation; Fig. 3 represents a section on line $a$—$a$ of Fig. 1; Fig. $3^a$ represents a detail view showing the indicating means for the devices for adjusting the support for tide and height above sea level; Figs. 4 and 5 represent sections respectively on lines $b$—$b$ and $c$—$c$ of Fig. 2; Fig. 6 represents a plan view of the finder, with the telescope removed; Fig. 7 is a diagram to illustrate the theory of the invention; Fig. 8 represents a section on line $d$—$d$ of Fig. 6; Fig. 9 represents a section on line $e$—$e$ of Fig. 8; Fig. 10 represents a detail view of the mechanism for turning the telescope in azimuth; and Fig. 11 represents a detail of the last mentioned mechanism on the line $f$—$f$ of Fig. 10.

To illustrate the principle upon which the invention works reference will first be had to the diagram shown in Fig. 7, wherein S represents sea level, neglecting the effect of the curvature of the earth, P the pivot of the telescope located at a known distance above the sea level, and A and B two known points, for instance, objects located respectively at 2000 and 12,000 yards from the telescope. These objects owing to the curvature of earth, instead of being positioned on the line S, will be positioned on the line S′, at A′ and B′ respectively, and owing to the refraction of the atmosphere will appear to be located on line S″ at A″ and B″ respectively, this last line, of course, varying from time to time. The instrument by a suitable mechanism embodying a movable support X the height of which is proportional to the distance of the pivotal axis of the telescope above sea level, is first adjusted horizontally on line Y so that the support moves relatively to the pivot a distance proportional to the distance of the object, in order that the telescope will be directed at the point A, a suitable indicating means being employed to determine the position of the support and indicating in this instance 2000 yards. Without shifting the support the telescope is adjusted by a suitable mechanism so that the object is properly imaged on the cross hairs or lines. The instrument, now corrected for this known point is directed at the point B by shifting the support so that the indicating means reads in this instance 12,000 yards. It is now corrected for this known point. Being correct for these two known points, it follows that it will be substantially correct for all intermediate points. Of course, corrections for other known points may be made. Corrections are also made for the tide, as will hereinafter more fully appear.

The embodiment of the invention herein shown comprises a pedestal 1 on which an azimuth table 2 is supported by leveling devices 3 so that the rotary support 4 may turn about a true vertical axis 5 in order that the finder may be pointed in any direction, a ball bearing ring 6 being arranged between the azimuth table and the rotary support to permit the support to turn freely. The mechanism for rotating the support preferably comprises a worm wheel 7 integral with the table and engaged by a worm 8 arranged on a manually operable shaft 9. This shaft 9 is journaled in a tubular casing 10 pivoted at 11 on the rotary support so that the worm may be swung into and out of engagement with the worm wheel, in order that the support may be turned independently of the operating means. A locking device in the form of an axially movable and manually operable stop 12 may hold the casing 10 in position so that the worm will engage the worm wheel, its axial movement being effected by a spiral cam 12$^a$, which engages a projection 12$^b$ on the rotary support.

The position of the rotary table is ascertained from a circular scale 13 divided into 360° and visible through a window 14 in the rotary support, fraction of degrees being determined by a rotary indicator 13$^a$, supported by the casing 10 and geared to the shaft 19 so as to make one rotation for every rotation of the shaft, it, of course, being understood that each rotation of the shaft moves the rotary table one degree. The indicator 13$^a$ is visible through a window 15 also in the rotary support.

A suitable telescope 18 is carried by the rotary support which for this purpose may have a pair of upright bearing pieces 16 on which horizontal trunnions 17 on the telescope are supported so as to permit the latter to turn about a horizontal axis or pivot. Also carried by the rotary support is the movable support 19 which forms part of the mechanism for turning the telescope about its horizontal axis and is guided on the rotary support 4 on a track 20 so that it moves in the direction of the axis of the telescope. Its movement may be effected by a screw shaft 21 arranged longitudinally of the track and journaled in bearings 22, this screw being manually operable by means of a crank handle 23 arranged on stub shaft 24 which carries a bevel gear 25 meshing with a bevel gear 26 on the screw shaft 21.

The position of the support relatively to the axis of the telescope is determined by a suitable indicating means which moves in concordance with the telescope to determine the range or distance of the object. In the present instance this mechanism comprises an annulus 27 mounted on ball bearings to turn on the rotary support about an axis coincident with the turning axis of the latter. This annulus is inclosed by a housing 28 and carries a crown gear 29 exposed at one point in order that a pinion 30 on the screw shaft 21 may mesh therewith. On the upper face of the annulus, is formed a spiral groove or track or guide 31 and a spiral series of numbers ranging, in the present instance, from 2000 to 12,000 and indicating the distance of the object. The guide or track is engaged by a projection 32 on a shiftable window or indicating device 33 which in the present instance is guided in a transverse slot in the housing 28 and is carried by a flexible strip 33$^a$ passing under bars 34 and secured at its ends about drums 35 which are arranged on the rotary support and given a tendency by springs 35$^a$ to draw on the strip and keep it taut.

At its upper end the movable support 19 is bifurcated so that it may be positioned on opposite sides of the telescope, the arms 36 formed by the bifurcation each carrying slide blocks 37 which have trunnions 38 turning in the arms. These blocks move on a guide or track, in this instance in the form of ways 39, located on opposite sides of the telescope and carried thereby as by being arranged on a sleeve 40 to be hereinafter described.

In order to adapt the range finder for use at various elevations above sea level, I construct the movable support so that it is extensible, that is, I provide means for varying its length. For this purpose I prefer to form it of two members, the bifurcated or upper member and a lower member which is provided with a hollow post 41 to receive a depending screw rod 42 on the upper member. Arranged to turn on the lower member is a thumb nut composed of two members 43 and 44 relatively adjustable by a screw 45 to prevent any play on screw rod 42 which they engage in order to raise and lower the upper member and extend the support 19. To determine the elevation desired, there is provided a coarse indicating means and a fine indicating means. Each division of the coarse indicating means indicates in this instance 100 feet and comprises a scale 46 on the lower member, and a pointer 47 on the upper member. The fine indicating means indicates 1 to 100 feet and comprises a scale 48 on the thumb nut and an index 49 on the movable lower member. The index 49 is for mean tide and in order that correction may be made for high or low tide, I provide a device in the form of a ring 50 mounted to turn with the thumb nut and to turn relatively thereto and having a scale extending in opposite directions from a zero point. After the telescope has been adjusted for the height of the finder above mean tide, the ring 50 is turned so that the zero mark thereon alines with the height mark and also with an indicator 51 on the lower member of the support. The thumb nut is then turned in the direction of high or low tide. Correction of the indicating means for the curvature of the earth and for atmospheric refraction is obtained by a plurality of devices which shift the position of the guide on which the upper member of the support 19 travels. These devices, in the present instance, adjustably connect the track or guide to the telescope, one of them being arranged at the forward end of the sleeve 40 and the other being arranged at the rear end. The device at the forward end preferably is in the form of a screw rod 45 pivoted at 46 to the upper surface of the telescope, extending through an opening above it in the sleeve and engaged by an adjusting nut 47; while the adjusting device at the other end of the sleeve is in the form of a screw rod 48 which has a ball 49 at its lower end slidably engaging the telescope, its upper end being projected through an opening in the sleeve and engaged by a nut 50. Spring pressed plungers 51 are arranged on the sleeve below the telescope and engage the latter to prevent vibrations thereof.

In order that the sleeve and the telescope shall have only relative vertical movement, sliding engagement between said parts is established on opposite sides. For this purpose the telescope carries extensions 52 which work in ways 53 in the sleeve and receive thumb screws 54 which work in slots 55 in plates 56 secured over ways 53 and are adapted to hold the parts against movement after being adjusted by clamping the plates 56 against the extensions. The sleeve 40 has a hood 57 which receives a lamp to illuminate the cross lines of the telescope in any suitable manner. The trunnions of the telescope and the adjusting devices for the sleeve with extensions 52 are preferably carried by rings 58 which permit the telescope to rotate to test the collimination.

The operation of the finder will be clearly understood from the foregoing description, but it may be generally stated that the pedestal is situated in an elevated position with the turning point of the telescope at a known height above the sea level, the rotary support being adjusted so that it stands perfectly level. The horizontally movable support is then adjusted to agree with the height above sea level and tide and the support is moved horizontally until the indicating means indicates the distance of the nearest known point. The telescope is now adjusted independently of the indicating means to correct for this known point. The horizontally movable support is again shifted until the indicating means points to the distance or range of the other known point and the indicating means corrected for this point. The finder may now be employed to determine the position of any object between these points.

A range finder constructed in accordance with this invention is capable of being operated by a person who has no knowledge of higher mathematics, and in this manner an ordinary private may quickly ascertain the distance of an object corrected for the curvature of the earth and the refraction of the atmosphere.

I claim as my invention:

1. In a range finder, the combination with a telescope mounted to turn about a horizontal axis, of indicating means for determining the distance of an object, movable in concordance with the telescope, and devices for correcting the indicating means from a plurality of known points for the curvature of the earth and the refraction of the atmosphere.

2. In a range finder, the combination with a telescope mounted to turn about a horizontal axis, of indicating means for determining the distance of an object, movable in concordance with the telescope, a horizontally movable support connected to the indicating means and turning the telescope about its axis, a guide on which the support travels to determine the depression of the telescope, and a plurality of devices for shifting the guide to correct the indicating means from a plurality of known points for the curvature of the earth and the refraction of the atmosphere.

3. In a range finder, the combination with a telescope mounted to turn about a horizontal axis, of a support having a horizontal movement proportional to the range, an indicating means operating on the movement of the support, a guide carried by the telescope and on which the support travels during the turning of the telescope about its axis, and devices for adjusting the guide to correct the indicating means for the curvature of the earth and the refraction of the atmosphere.

4. In a range finder, the combination with a telescope mounted to turn about a horizontal axis, of indicating means for determining the distance of an object, movable in concordance with the telescope, a support having a horizontal movement, connected to the indicating means, a sleeve surrounding the telescope and having the support guided thereon, and devices for shifting the sleeve and the telescope relatively to each other to effect a correction of the indicating means for the curvature of the earth and the refraction of the atmosphere.

5. In a range finder, the combination with a telescope mounted to turn about a horizontal axis, of a support having a horizontal movement, means for varying the length of the support to accommodate the finder to different heights above sea level, an indicating means operating on the movement of the support, a guide carried by the telescope, and devices for adjusting the guide to correct the indicating means for the curvature of the earth and the refraction of the atmosphere.

6. In a range finder, the combination with a telescope mounted to turn about a horizontal axis, of a support having a horizontal movement, a pair of ways arranged on opposite sides of the telescope and having the support movable thereon, range indicating means operating on the movement of the support, and devices for adjusting the ways to correct the indicating means for the curvature of the earth and the refraction of the atmosphere.

7. In a range finder, the combination with a telescope mounted to turn about a horizontal axis, of a support having a horizontal movement, a sleeve surrounding the telescope and guided for vertical movement thereon, a guide for the support on the sleeve, range indicating means moving with the support, and devices for relatively moving the telescope and the sleeve to correct the indicating means for the curvature of the earth and the refraction of the atmosphere.

8. In a range finder, the combination with an azimuth table and a rotary support turning about a vertical axis thereon, of indicating means rotating about the same axis, a telescope mounted to swing about a horizontal axis on the support, and a support movable horizontally on the rotary support and connected to the indicating means for shifting the latter.

9. In a range finder, the combination with a telescope mounted to turn about a horizontal axis, of a rotary indicator movable therewith, having a spiral track thereon, a housing for the indicator having a slot therein, a strip covering the slot, having a window therein and provided with means coöperating with the spiral track to move the window with the indicator.

10. In a range finder, the combination with an azimuth table and a rotary support, of a telescope mounted on the support to turn about a horizontal axis, an indicator having crown gear thereon and rotatable about an axis coincident with the axis of the rotary support, a screw shaft mounted on the support and geared to the crown gear, and a horizontally movable support operated by the screw shaft and guided on the rotary support and the telescope.

11. In a range finder, the combination with a rotary support, rotatable about a vertical axis, of a telescope mounted to swing about a horizontal axis on the support, a horizontally movable support guided on the rotary support and on the telescope, and means for varying the length of the horizontally movable support to accommodate the finder to different sea levels.

12. In a range finder, the combination with a telescope mounted to swing about a horizontal axis, of a horizontally movable support, a sleeve surrounding the telescope and having ways on which the support moves, and a pair of adjusting devices connecting the sleeve and the telescope, one of which comprises a screw rod pivoted to the top of the telescope and projecting through the sleeve, and a nut engaging said rod; and the other of which comprises a screw bolt slidingly engaging the telescope and projecting through the sleeve, and a nut engaging said bolt.

13. In a range finder, the combination with a telescope mounted to swing about a horizontal axis, of a horizontally movable support, a sleeve surrounding the telescope and having ways on which the support moves, a pair of adjusting devices connecting the sleeve and the telescope, one of which comprises a screw rod pivoted to the top of the telescope and projecting through the sleeve, and a nut engaging said rod, and the other of which comprises a screw bolt slidingly engaging the telescope and projecting through the sleeve, and a nut engaging said bolt; and spring pressed plungers carried at the bottom of the sleeve and bearing against the telescope.

14. A range finder comprising a pedestal, an azimuth table, leveling devices connecting the table and the pedestal, a rotary support turning about a vertical axis on the table, mechanism for turning the support in azimuth, a telescope mounted on the support to turn about a horizontal axis, a support guided horizontally on the rotary support, a screw shaft for moving the support, an indicating annulus operated by the shaft, a sleeve surrounding the telescope, a guide on the sleeve on which the support moves, and devices for relatively adjusting the sleeve and the telescope to correct for the curvature and the refraction.

15. In a range finder, the combination with a telescope mounted to swing about a horizontal axis, of a horizontally movable support, means for varying the length of the support to accommodate the finder to different sea levels, a device for correcting for the tide, and devices for correcting for the curvature of the earth and the refraction of the atmosphere.

DESIDERIUS VON NAGY.

Witnesses:
OSCAR KALLENBACH,
H. H. SIMMS.